(12) United States Patent
Toennis et al.

(10) Patent No.: US 7,965,701 B1
(45) Date of Patent: Jun. 21, 2011

(54) METHOD AND SYSTEM FOR SECURE COMMUNICATIONS WITH IP TELEPHONY APPLIANCE

(75) Inventors: Roger L. Toennis, Arvada, CO (US); Richard L. Robinson, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 1566 days.

(21) Appl. No.: 11/119,188

(22) Filed: Apr. 29, 2005

Related U.S. Application Data

(60) Provisional application No. 60/615,302, filed on Sep. 30, 2004.

(51) Int. Cl.
*H04L 12/66* (2006.01)

(52) U.S. Cl. ............... 370/352; 370/395.2; 380/277; 713/160

(58) Field of Classification Search ............. 370/352
See application file for complete search history.

(56) References Cited

U.S. PATENT DOCUMENTS

| | | | |
|---|---|---|---|
| 4,288,659 A | 9/1981 | Atalla | |
| 4,780,821 A | 10/1988 | Crossley | |
| 4,811,393 A | 3/1989 | Hazard | |
| 4,888,800 A | 12/1989 | Marshall et al. | |
| 4,937,863 A | 6/1990 | Robert et al. | |
| 5,157,663 A | 10/1992 | Major et al. | |
| 5,179,591 A | 1/1993 | Hardy et al. | |
| 5,204,897 A | 4/1993 | Wyman | |
| 5,206,903 A | 4/1993 | Kohler et al. | |
| 5,230,020 A | 7/1993 | Hardy et al. | |
| 5,260,999 A | 11/1993 | Wyman | |
| 5,307,481 A | 4/1994 | Shimazaki et al. | |
| 5,329,570 A | 7/1994 | Glassmacher et al. | |
| 5,341,427 A | 8/1994 | Hardy et al. | |
| 5,347,580 A | 9/1994 | Molva et al. | |
| 5,386,369 A | 1/1995 | Christiano | |
| 5,390,297 A | 2/1995 | Barber et al. | |
| 5,408,649 A | 4/1995 | Beshears et al. | |
| 5,448,639 A | 9/1995 | Arazi | |
| 5,553,143 A | 9/1996 | Ross et al. | |
| 5,563,946 A | 10/1996 | Cooper et al. | |
| 5,671,412 A | 9/1997 | Christiano | |
| 5,699,431 A | 12/1997 | Van Oorschot et al. | |
| 5,708,709 A | 1/1998 | Rose | |
| 5,717,604 A | 2/1998 | Wiggins | |

(Continued)

FOREIGN PATENT DOCUMENTS

EP 1071253 1/2001

OTHER PUBLICATIONS

U.S. Appl. No. 11/051,316, Mazza (filed Feb. 4, 2005).

(Continued)

*Primary Examiner* — MD S Elahee
*Assistant Examiner* — Ibraham Sharifzada
(74) *Attorney, Agent, or Firm* — Sheridan Ross P.C.

(57) ABSTRACT

A method and system are disclosed for providing secure communications with a communication appliance such as an IP telephone, wherein such an appliance has a reduced risk to attacks by unauthorized or rogue applications. In particular, "denial of service" and "man-in-the-middle" attacks are prevented. One embodiment establishes authenticated and encrypted communications with a single IP server for transmitting and receiving substantially all IP application communications with third parties.

18 Claims, 2 Drawing Sheets

U.S. PATENT DOCUMENTS

| | | | |
|---|---|---|---|
| 5,742,757 | A | 4/1998 | Hamadani et al. |
| 5,745,576 | A | 4/1998 | Abraham et al. |
| 5,745,879 | A | 4/1998 | Wyman |
| 5,758,068 | A | 5/1998 | Brandt et al. |
| 5,758,069 | A | 5/1998 | Olsen |
| 5,790,074 | A | 8/1998 | Rangedahl et al. |
| 5,790,548 | A * | 8/1998 | Sistanizadeh et al. ........ 370/401 |
| 5,790,664 | A | 8/1998 | Coley et al. |
| 5,828,747 | A | 10/1998 | Fisher et al. |
| 5,905,793 | A | 5/1999 | Flockhart et al. |
| 5,905,860 | A | 5/1999 | Olsen et al. |
| 5,940,504 | A | 8/1999 | Griswold |
| 5,960,085 | A | 9/1999 | de la Huerga |
| 5,978,565 | A | 11/1999 | Ohran et al. |
| 5,982,873 | A | 11/1999 | Flockhart et al. |
| 6,011,973 | A | 1/2000 | Valentine et al. |
| 6,023,766 | A | 2/2000 | Yamamura |
| 6,067,621 | A | 5/2000 | Yu et al. |
| 6,108,703 | A | 8/2000 | Leighton et al. |
| 6,128,389 | A | 10/2000 | Chan et al. |
| 6,134,660 | A | 10/2000 | Boneh et al. |
| 6,148,415 | A | 11/2000 | Kobayashi et al. |
| 6,163,607 | A | 12/2000 | Bogart et al. |
| 6,173,053 | B1 | 1/2001 | Bogart et al. |
| 6,192,122 | B1 | 2/2001 | Flockhart et al. |
| 6,314,565 | B1 | 11/2001 | Kenner et al. |
| 6,498,791 | B2 | 12/2002 | Pickett |
| 6,502,079 | B1 | 12/2002 | Ball et al. |
| 6,513,121 | B1 | 1/2003 | Serkowski |
| 6,574,612 | B1 | 6/2003 | Baratti et al. |
| 6,584,454 | B1 | 6/2003 | Hummel, Jr. et al. |
| 6,640,305 | B2 | 10/2003 | Kocher et al. |
| 6,675,208 | B1 | 1/2004 | Rai et al. |
| 6,765,492 | B2 | 7/2004 | Harris |
| 6,775,782 | B1 | 8/2004 | Buros et al. |
| 6,778,820 | B2 | 8/2004 | Tendler |
| 6,826,606 | B2 | 11/2004 | Freeman et al. |
| 6,850,958 | B2 | 2/2005 | Wakabayashi |
| 6,854,010 | B1 | 2/2005 | Christian et al. |
| 6,883,095 | B2 | 4/2005 | Sandhu et al. |
| 6,920,567 | B1 | 7/2005 | Doherty et al. |
| 6,928,166 | B2 | 8/2005 | Yoshizawa |
| 6,928,558 | B1 | 8/2005 | Allahwerdi et al. |
| 6,934,848 | B1 | 8/2005 | King et al. |
| 6,976,164 | B1 | 12/2005 | King et al. |
| 6,993,664 | B2 | 1/2006 | Padole et al. |
| 7,032,113 | B2 | 4/2006 | Pendlebury |
| 7,035,410 | B1 * | 4/2006 | Aiello et al. .................. 380/247 |
| 7,080,402 | B2 | 7/2006 | Bates et al. |
| 7,085,382 | B2 | 8/2006 | Terao et al. |
| 7,100,200 | B2 | 8/2006 | Pope et al. |
| 7,127,442 | B2 | 10/2006 | Mazza et al. |
| 7,139,737 | B2 | 11/2006 | Takahashi et al. |
| 7,143,409 | B2 | 11/2006 | Herrero |
| 7,197,321 | B2 | 3/2007 | Erskine et al. |
| 7,216,363 | B2 | 5/2007 | Serkowski et al. |
| 7,228,567 | B2 | 6/2007 | Serkowski et al. |
| 7,260,557 | B2 | 8/2007 | Chavez |
| 7,272,500 | B1 | 9/2007 | Walker |
| 7,278,164 | B2 | 10/2007 | Raiz et al. |
| 7,283,519 | B2 | 10/2007 | Girard |
| 7,310,734 | B2 | 12/2007 | Boate et al. |
| 7,353,388 | B1 | 4/2008 | Gilman |
| 7,373,657 | B2 | 5/2008 | Walker |
| 7,453,355 | B2 | 11/2008 | Bergstrom et al. |
| 7,499,865 | B2 | 3/2009 | Aggarwal et al. |
| 7,536,356 | B2 | 5/2009 | Eng |
| 7,681,245 | B2 | 3/2010 | Walker et al. |
| 7,698,225 | B2 | 4/2010 | Walker et al. |
| 7,707,116 | B2 | 4/2010 | Walker et al. |
| 7,707,405 | B1 | 4/2010 | Gilman |
| 7,747,851 | B1 | 6/2010 | Robinson |
| 7,831,457 | B2 | 11/2010 | Varadarajan et al. |
| 2001/0001268 | A1 | 5/2001 | Menon et al. |
| 2002/0017977 | A1 | 2/2002 | Wall |
| 2002/0038422 | A1 | 3/2002 | Suwamoto et al. |
| 2002/0052939 | A1 | 5/2002 | Lee |
| 2002/0064149 | A1 | 5/2002 | Elliott et al. |
| 2002/0083003 | A1 | 6/2002 | Halliday et al. |
| 2002/0087892 | A1 | 7/2002 | Hideyo |
| 2002/0107809 | A1 | 8/2002 | Biddle et al. |
| 2002/0112186 | A1 | 8/2002 | Ford et al. |
| 2002/0131402 | A1 * | 9/2002 | Lee et al. ...................... 370/352 |
| 2002/0154777 | A1 | 10/2002 | Candelore |
| 2002/0188656 | A1 | 12/2002 | Patton et al. |
| 2002/0188704 | A1 | 12/2002 | Gold |
| 2003/0013411 | A1 | 1/2003 | Uchiyama |
| 2003/0055749 | A1 | 3/2003 | Carmody et al. |
| 2003/0144959 | A1 | 7/2003 | Makita |
| 2003/0149874 | A1 | 8/2003 | Balfanz et al. |
| 2003/0208449 | A1 | 11/2003 | Diao |
| 2004/0044630 | A1 | 3/2004 | Walker et al. |
| 2004/0073517 | A1 | 4/2004 | Zunke et al. |
| 2004/0078339 | A1 | 4/2004 | Goringe et al. |
| 2004/0103324 | A1 | 5/2004 | Band |
| 2004/0128551 | A1 | 7/2004 | Walker et al. |
| 2004/0162998 | A1 | 8/2004 | Tuomi et al. |
| 2004/0181696 | A1 | 9/2004 | Walker |
| 2005/0202830 | A1 | 9/2005 | Sudit |
| 2006/0036894 | A1 | 2/2006 | Bauer et al. |
| 2006/0242083 | A1 | 10/2006 | Chavez |

OTHER PUBLICATIONS

"Accessing a Smart Card," Microsoft Corporation, Aug. 2002, http://msdn.microsoft.com/library/en-us/security/security/accessing_a_smart_card.asp, p. 1.

"Back Up Your Encrypting File System Private Key in Windows 2000 Download," Security Config, 2003, printed Aug. 13, 2004, http://www.securityconfig.com/software/alerts/back_up_your_encrypting_file_system_private_key_in_windows_2000.html, 2 pages.

"Base Service Providers," Microsoft Corporation, Aug. 2002, http://msdn.microsoft.com/library/en-us/security/security/base_service_providers.asp, p. 1.

"Building a Corporate Public Key Infrastructure," Infosec Engineering, 1999, http://www.infoseceng.com/corppki.htm, 20 pages.

"Building an ISO7816-4 APDU Command," Microsoft Corporation, Aug. 2002, http://msdn.microsoft.com/library/en-us/security/security/building_an_iso7816_4_apdu_command.asp, pp. 1-2.

"Catalyst DRM Service Platform Architecture: Vers. 1.0," LockStream Corporation, Nov. 2003, pp. 1-28.

"Catalyst DRM Service Platform," LockStream Corporation, 2003, http://www.lockstream.com/products_spcm.php, 1 page.

"Certificate Server: Public Key Infrstructure," Novell® White Paper, 1999, pp. 1-10.

"Cubic Corp. Introduces New National Security and Homeland Defense," Smart Card Alliance Industry News, Sep. 9, 2002, http://www.smartcardalliance.org/industry_news/industry_news_item.cfm?itemID=310, 2 pages.

"Cubic Introduces New Mobile Ticketing Machine," Smart Card Alliance Industry News, Jul. 3, 2003, http://www.smartcardalliance.org/industry_news/industry_news_item.cfm?itemID=852, 2 pages.

"Digital Cinema Key Management Messages," D-Cinema Draft 1, Aug. 8, 2002, pp. 1-9.

"Enabling Virtual Public Networks with Public Key Infrastructure," SSH Communications Security Corp., White Paper, Jan. 2004, pp. 1-9.

"Entrust Authority Security Manager," Entrust Inc., printed Aug. 13, 2004, http://www.entrust.com/authority/manager/index.htm, 23 pages.

"Global Control of All Buying and Selling Now Possible," Discerning the Times Digest and Newsbytes, Jan. 2000, vol. 1(1), http://www.discerningtoday.org/members/Digest/2000Digest/Jan./Global%20Control.htm, 2 pages.

"Introducing Smart Cards to the System," Microsoft Corporation, Aug. 2002, http://msdn.microsoft.com/library/en-us/security/security/introducing_smart_cards_to_the_system.asp, p. 1.

"IP Phone SI-160 User Manual (SCCP releases)," Version 1.2, ADTech Engineering, 2002, pp. 1-20.

"Lockstream KeyDRM," LockStream Corporation, 2003, http://www.lockstream.com/products_lgm.php, 2 pages.

"Lockstream OMA 1.0 DRM Client," LockStream Corporation, 2003, http://www.lockstream.com/products_sprm.php, 2 pages.

"PKI," Whatis.com Target Search™, Jan. 13, 2004, http://whatis.techtarget.com/definition/0,2989893,sid9_gci214299,00.html, 4 pages.

"Primary Service Provider," Microsoft Corporation, Aug. 2002, http://msdn.microsoft.com/library/en-us/security/security/primary_service_providerasp, p. 1.

"Public Key Infrastructure (PKI) FAQs," Articsoft Limited, Feb. 2, 2003, available at http://www.articsoft.com/wp_pki_faq.htm, 5 pages.

"Public Key Infrastructure," ARSYS, Feb. 4, 2001, available at http://www.transactiontrust.com/technicaindex.html, 4 pages.

"Securing a Virtual Private Network with Smart Card Technology," Datakey, Aug. 1, 2002, available at www.datakey.com, pp. 1-8.

"Smart Card Authentication," Microsoft Corporation, Aug. 2002, http://msdn.microsoft.com/library/en-us/security/security/smart_card_authentication.asp, pp. 1-2.

"Smart Card Interfaces," Microsoft Corporation, Aug. 2002, http://msdn.microsoft.com/library/en-us/security/security/smart_card_interfaces.asp, pp. 1-2.

"Smart Card Overview," Sun Developer Network, Sun Microsystems, Inc., copyright 1994-2004, printed Aug. 13, 2004, http://java.sun.com/products/javacard/smartcards.html, 2 pages.

"Smart Card Resource Manager," Microsoft Corporation, Aug. 2002, http://msdn.microsoft.com/library/en-us/security/security/smart_card_resource_managerasp, pp. 1.

"Smart Card Service Providers," Microsoft Corporation, Aug. 2002, http://msdn.microsoft.com/library/en-us/security/security/smart_card_service_providers.asp, pp. 1.

"Smart Card User Interface," Microsoft Corporation, Aug. 2002, http://msdn.microsoft.com/library/en-us/security/security/smart_card_user_interface.asp, pp. 1.

"Smart Card," NetLingo Dictionary of Internet Words, copyright 1995-2004, printed Aug. 13, 2004, http:www.netlingo.com/lookup.cfm?term=smart+card, 2 pages.

"The Cricket Indoor Location System," An NMS Project, MIT Laboratory for Computer Science, printed Jul. 31, 2002, http://nms.lcs.mit.edu/projects/cricket/, 5 pages.

"Vendor Wrapper Service Providers," Microsoft Corporation, Aug. 2002, http://msdn.microsoft.com/library/en-us/security/security/vendor_wrapper_service_providers.asp, pp. 1.

"VeriFone 2000, MS/DUKPT/STD Pin Pad, New," Info Merchant Store, printed Feb. 17, 2004, http://www.merchantamerica.com/creditcardterminals/index.php?ba=product_enlarge&product=96 32, 1 page.

"VeriFone Payment Solutions: Point-of-Sale PINpads," VeriFone Inc., copyright 1997-2004, printed Feb. 17, 2004, http://www.verifone.com/products/printers_peripherals/html/pinpad_family.html, 1 page.

Clark, R., "Centrelink Smart Card Technical Issues Starter Kit Chapter 7," Apr. 8, 1998, http://www.anu.edu.au/people/Roger.Clarke/DV/SCTISK.html, pp. 1-3.

Dierks et al., "RFC 2246—The TLS Protocol, Version 1.0," The Internet Society, Jan. 1999, http://www.ietf.org/rfc/rfc2246.txt, pp. 1-80.

Federal Information Processing Standards Publication 180-1, "Secure Hash Standard," U.S. Department of Commerce and National Institute of Standards and Technology, Apr. 17, 1995, 24 pages.

Griswold, R.S., "Get Smart: The Coming Revolution of Smart Cards," Journal of Property Management, May/Jun. 1997, 5 pages.

Krawczyk et al., "RFC 2104—HMAC: Keyed-Hashing for Message Authentication," Feb. 1997, http://www.ietf.org/rfc/rfc2104.txt, pp. 1-11.

Press Release, "ERG Motorola Alliance Receives Award for Smart Card," Motorola, Jun. 6, 2000, http://motorola.com/LMPS/pressreleases/page88.htm, 3 pages.

Press Release, "Establishment of 'SmartCardInfrontia' solutions for 'IC card'," NEC Infrontia Corporation, Mar. 13, 2002, 4 pages.

Rankl, W., "Smart Card Handbook," Homepage of Wolfgang Rankl, http://www.wrankl.de/SCH/SCH.html, last updated Jun. 13, 2004, 8 pages.

Rescorla, "RFC 2818—HTTP Over TLS," The Internet Society, May 2000, http://www.ietf.org/rfc/rfc2818.txt, pp. 1-6.

Rivest, "RFC 1321—The MD5 Message-Digest Algorithm," Apr. 1992, http://www.ietf.org/rfc/rfc1321.txt, pp. 1-21.

Russinovich, M., "Inside Encrypting File System, Part 1," Windows & .NET Magazine, Jun. 1999, http://www.winntmag.com/Articles/Index.cfm?ArticleID=5387&Key=Internals, 4 pages.

Russinovich, M., "Inside Encrypting File System, Part 2," Windows & .NET Magazine, Jul. 1999, http://www.winntmag.com/Articles/Index.cfm?ArticleID=5592&Key=Internals, 5 pages.

Streetman et al., "Public Key Infrastructure: Resources, Requirements and Recommendations," ATI IPT Special Report 00-06, Apr. 2000, pp. 1-45.

* cited by examiner

METHOD AND SYSTEM FOR SECURE COMMUNICATIONS WITH IP TELEPHONY APPLIANCE

RELATED APPLICATIONS

The present application claims the benefit of U.S. Provisional Patent Application No. 60/615,302 filed Sep. 30, 2004, which is incorporated by reference herein.

RELATED FIELD OF INVENTION

The present invention is related to Internet Protocol network method and system for obtaining secure, managed access to IP telephony appliances/devices, and for interacting with the capabilities of such devices.

BACKGROUND

Voice telecommunication infrastructures have traditionally been implemented with technologies very different from the technologies that are at the foundation of Internet-based communication systems. However, most telecommunications equipment providers and service providers are rapidly migrating their voice telecommunication applications to use IP networks for the transport of voice in the form of data. Such migrated applications are broadly referred to as Voice over Internet Protocol (VoIP). In particular, technologies supporting VoIP applications merge the transport of voice telephony data with the data transport for other IP-enabled applications on IP networks.

Adoption of IP telephony services by corporations and other large organizations is also accelerating. Many new VoIP deployments are targeted for internal use by corporations on their private local area networks (LANs). Additionally, VoIP technology also enables commercial telephony service providers to offer IP-based telephony for their commercial market customers. In particular, various Internet/IP telephony solutions are commercially available that provide communication services via the Internet (e.g., Vonage 2147 Route 27 Edison, N.J., USA 08817, Packet88x8, Inc. 2445 Mission College Blvd, Santa Clara, Calif. 95054, etc). As such IP telephony services gain popularity and interoperate with traditional Internet-based services (e.g., e-mail, instant messaging, display of graphics, video, music, popup advertising, corporate directory, accounting, expense management, package tracking, etc.), the communication appliances (e.g., IP telephones) utilizing such services will be subject to security attacks similar to those that Internet-connected personal computers (PCs) have experienced. The IP-based applications providing telephony services are often referred to as CTI Applications or "computer telephony interface applications" because these applications provide substantial interaction or communication between a communication appliance and an Internet (or Intranet) computer server (e.g., an email server) which may be also providing one or more telephony services. Moreover, such communication appliances enabled for CTI application access can experience particularly troublesome security attacks since they simultaneously connect to: (a) telephony networks for traditional telephony services (switched or otherwise) which have historically not exposed to hackers, and (b) data networks (which are frequently the target of hacking attempts, network storms, or malware, as one skilled in the art will understand). For example, in the current state of the art, the firmware for a CTI-enabled IP telephone must continuously monitor one or more IP ports thereby listening for network broadcast requests from the CTI applications that the phone's current user is authorized to use. Upon receiving an initial network broadcast request from substantially any CTI application, the IP telephone may, with minimal or no authentication and/or authorization checks, respond with information sufficient for a requesting CTI application to carry out unauthorized and/or damaging attacks, e.g., via the IP telephone. In particular, during an initial handshake exchange of information between the IP telephone and the CTI application, the IP telephone may provide the phone's IP address or its telephone number (also referred to as its "extension"). With an IP telephone's IP address or its telephone number captured, a rogue CTI application may impersonate (a.k.a. spoof) the IP telephone's identity for unintended and/or destructive purposes. These types of vulnerabilities can provide the opportunity for a number of network attacks, including:

(a) Denial of service (DOS) attacks, wherein an illicitly registered application floods an IP telephone with a sufficiently high volume of requests so that the telephone is effectively non-responsive to one or more legitimate network requests. Thus, e.g., the telephone may appear to a user of the telephone to be fully operative while in fact it is: (i) unresponsive to a legitimate network call (via the traditional telephony switched network or the packetized non-switched IP network), and/or (ii) prevented from timely incorporating a new firmware upgrade; and/or (b) "Man-in-the-middle" attacks, wherein a non-registered or illicitly registered application monitors communications at an IP telephone (via either or both of the traditional telephony switched network or the packetized non-switched IP network), and intercepts a registration request by a legitimate application for spoofing a reply to the IP telephone or to the legitimate application. In particular, the illicit application could provide the legitimate application with a false IP address for sending login information so that the illicit application can then login to the legitimate application.

Thus, it would be desirable to have IP telephones that are more secure from at least denial of services attacks, and man-in-the-middle attacks as well as other security compromising attacks from, e.g., hackers and/or illicit network applications. More particularly, it would be desirable to ensure that IP telephones do not blindly follow directions received from a network application without better determining that the application is a trusted information source.

SUMMARY

The present invention is a method and system for providing and maintaining secure communications between a network communication appliance (such as an IP telephone), and one or more network applications. In particular, the present invention provides secure communications with such a network communication appliance while allowing a user thereof simultaneously to access both:

(a) standard/advanced telephony services (e.g., teleconferencing, call transfer, call hold, call forwarding, call waiting, caller id etc.) offered by IP telephony servers, and (b) IP/Web-based software application services (e.g., e-mail, instant messaging, display of graphics, video, music, popup advertising, a corporate directory, accounting applications, expense management applications, package tracking applications, etc.) offered by Internet Protocol based networks.

Thus, the present invention substantially reduces the likelihood that illicit or unauthorized communications with such network communication appliances can be performed. More particularly, the present invention substantially prevents, e.g., the above-identified vulnerabilities of denial of service, and "man-in-the-middle" attacks.

In providing secure network communications with such network communication appliances, the present invention establishes and uses authenticated and encrypted communications between each such network communication appliance, and a corresponding appliance connection server, wherein the appliance connection server is a trusted intermediary between the network communication appliance and substantially all other network applications that communicate with the network communication appliance. Thus, such a network communication appliance will not respond as requested to communications received from sources other than the appliance connection server, and in particular, the network communication appliance may ignore and/or log communications from sources other than the appliance connection server as illegitimate communications. In this manner, such a network communication appliance is insulated from various types of attacks to illicitly gain information and/or illicitly control the network communication appliance (e.g., an IP telephone). Moreover, it is an aspect of the present invention to provide a method and system for establishing secure communications between a plurality of such network communication appliances (e.g., IP telephones) and the appliance connection server.

It is also an aspect of the present invention that such a network communication appliance can be activated for communication on a network without substantial programmatic configuration. In particular, the communication appliance may activate built-in programming for broadcasting its presence on one or more networks for obtaining information that allows the communication appliance to establish secure communications with a corresponding appliance connection server that effectively functions as a gateway and/or broker between the communication appliances, and network applications who wish to communicate with the communication appliance. For example, an IP telephone according to the present invention may be purchased, removed from its packaging, provided with a network connection, and powered up, wherein the IP telephone subsequently establishes a secure network connection with an appliance connection server without further effort by an installer of the IP telephone.

In at least some embodiments of the present invention, the following steps are performed by the network communications appliance for establishing secure communications with an appliance connection server:

(a) activate the network communication appliance for communicating on a telephony network, and additionally communicating on an IP network (e.g., the IP network being the Internet, a virtual private IP network, an enterprise-wide network, or any other IP or TCP/IP based network);

(b) perform a first collection of communications between the network communication appliance and a network node identified by a first IP address for establishing a first communication therebetween;

(c) receive an IP address for the network communication appliance via the first collection of communications;

(d) receive update information related to an update of operational information used in operating the network communication appliance, wherein the update information is received via an encrypted and authenticated communication on the IP network from an IP server;

(e) determine security information for encrypting and authenticating IP communications received by the network communication appliance from an IP server, wherein the security information is determined via an encrypted and authenticated communication on the IP network;

(f) use the security information for encrypting and authenticating IP communications between the IP server and the network communication appliance, including authenticating each IP communication received on a particular port of the network communication appliance for determining whether the communication is from the IP server, wherein subsequent processing of each IP communication on the port is dependent upon a result from the authenticating step that the IP communication is from the IP server such that a non-authenticated IP communication received at the port is not further processed in a manner that the IP communication would be processed if authenticated; and (g) establish communication with a computer telephony interface application server via a secure communication connection on the particular port, the communication including the receipt of communications as well as negotiation of additional keys and methods for subsequent encryption and authentication.

Other benefits and advantages of the present invention will become apparent from the accompanying drawing and the Detailed Description hereinbelow.

DETAILED DESCRIPTION

Figure 1:
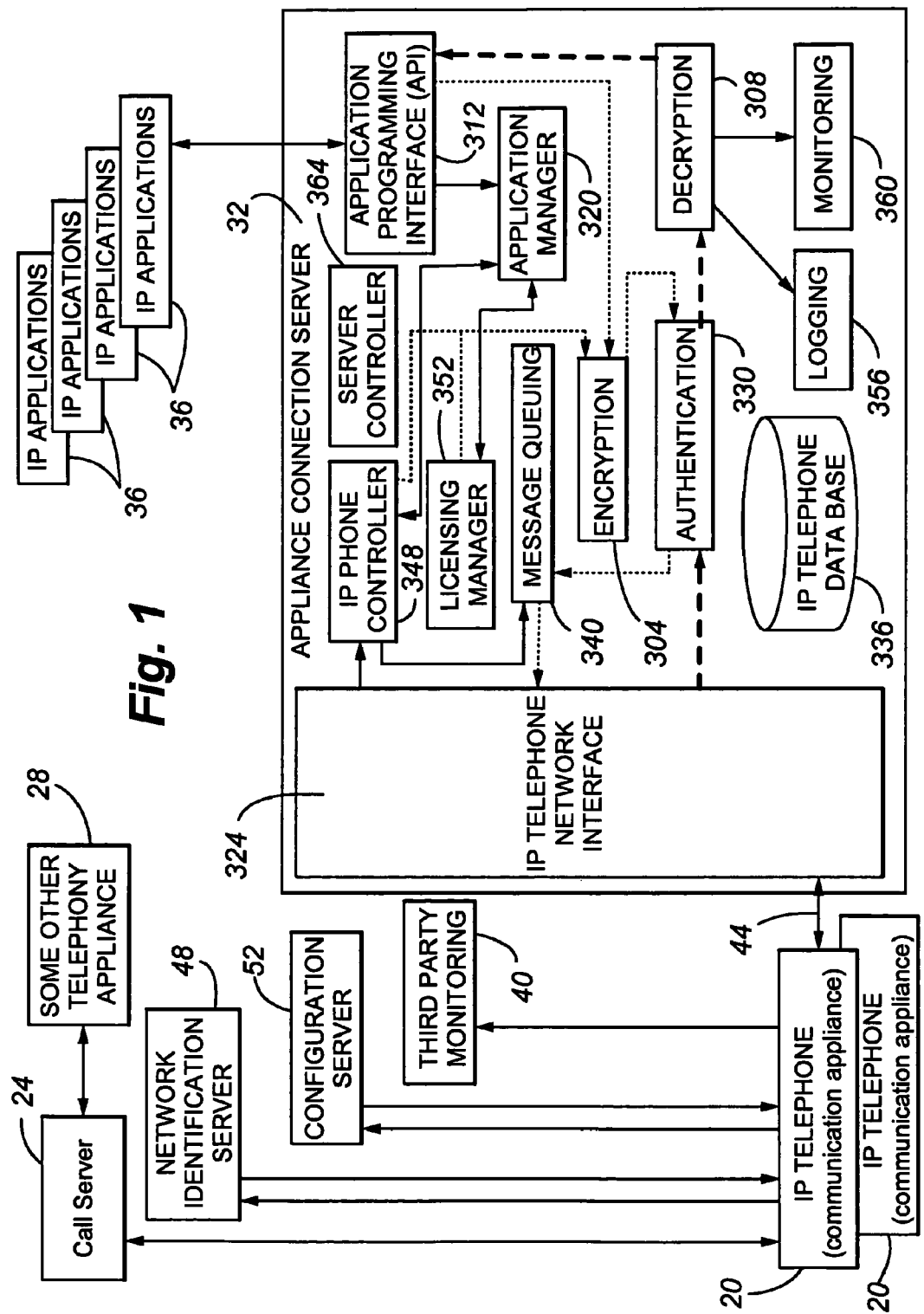
FIG. 1 is a block diagram illustrating the network communications between network communications appliances 20 and various network nodes. Additionally, the present figure shows the high-level components within one embodiment of an appliance connection server 32.

FIG. 1 provides a high-level illustration of the present invention. An IP telephone 20 (more generally also referred to as a communication appliance) includes both features of a conventional telephone and features of a networked computer, e.g., having an Internet browser. An illustrative example of such an IP telephone is Avaya 4620 IP Telephone by Avaya Inc., New Jersey 211 Mt. Airy Road Basking Ridge, N.J., U.S.A. 07920. Accordingly, when fully operational the IP telephone 20 communicates with a telephony call server 24 (such as the product known as "Communication Manager" by Avaya Inc.) for performing conventional telephony services such as calling another party, caller id, call forwarding, etc. Note that the call server 24 may also be initially involved in both circuit switched telephony services as well as digital packetized network communications such as is performed on an Internet Protocol (IP) network. Accordingly, the call server 24 will typically be contacted by the IP telephone 20 for setting up a call with another telephony appliance 28 such as a landline phone, a wireless phone, another IP telephone, etc. In addition to the call server 24, in a fully operational mode the IP telephone 20 communicates with substantially only one additional server for receiving and/or establishing communications with third parties, that is, the appliance connection server 32. The appliance connection server 32 may be considered a broker or gateway between the IP telephone 20 and third parties (e.g., IP applications 36) that request to establish communications with the IP telephone. Accordingly, as will described further hereinbelow, the appliance connection server 32 provides the IP telephone 20 with a trusted source for IP network communications such as those of a local area IP network, a site IP network, an enterprise-wide IP network spanning multiple sites, and/or the Internet. Thus, the appliance connection server 32 becomes an intermediary for IP communications from IP applications 36 to the IP telephone 20, wherein:

(a) all communications between the IP telephone and the appliance connection server 32 are authenticated and encrypted;

(b) various IP telephone services can be coalesced (e.g., licensing and/or billing of services, logging of network use by users of IP telephones 20, and/or monitoring use of IP telephones); and/or (c) the appliance connection server may assist in the monitoring of IP telephones by a third party 40, such as the U.S. Federal Bureau of Investigation, as well as other law enforcement agencies.

Accordingly, once the IP telephone 20 establishes secure IP network communications 44 with the appliance connection server 32 (i.e., both authenticated and encrypted communications), network security issues such as the following are substantially alleviated: (a) denial of service, e.g., due to a high volume of IP network requests to the IP telephone, and (b) an eavesdropper or "man in the middle" monitoring of communications with the IP telephone, and using the information obtained to illicitly send or spoof messages to the IP telephone, or to an application which has a user of the IP telephone registered for receiving service from the application.

Prior to an IP telephone 20 becoming fully operational, it is an aspect of the present invention that it establishes secure communications with the appliance connection server 32 so that a first communication, as well as every subsequent communication, on a predetermined port of the IP telephone 20 be can fully trusted as both authentic and private. Accordingly, during a process of the IP telephone 20 becoming fully functional (i.e., booting up), when first activated the IP telephone 20 will initiate and broadcast network (IP) messages to a network identification server 48, wherein this server responds with a message that contains both an IP address for the IP telephone 20, and a second network (IP) address which is the address of a configuration server 52. An example of such a network identification server 48 is the PowerEdge Server manufactured by Dell; however, other servers provided by, e.g., Sun Microsystems Inc. 4150 Network Circle Santa Clara, Calif. 95054, may be also used with the present invention.

The configuration server 52 provides the IP telephone 20 with most of the additional information it needs to become fully functional. In particular, when the IP telephone 20 receives the IP address of the configuration server 52, the IP telephone sends a network (IP) message to the configuration server 52 requesting configuration information. In response, as will be described further hereinbelow, the configuration server 52 provides the IP telephone 20 with the IP address of an appliance connection server 32, and may also provide the IP telephone with one or more of the following:

(a) Any IP telephone firmware updates that are needed for proper functioning of the IP telephone 20. For example, the IP telephone may have been in storage for some number of months and its firmware may be insufficient to make the IP telephone fully operable. Alternatively, the IP telephone 20 may be frequently used, wherein users login and logout to the phone, and its firmware requires an update. Accordingly, when an enhanced version of the IP telephone's firmware becomes available, the phone may be deactivated and then reactivated (i.e., rebooted) so that the phone then obtains firmware updates from the configuration server 52;

(b) Any IP telephone 20 needed script files, e.g., such as displayed messages in a particular language; and/or (c) Other information such as configuration information for the accessory hardware utilized with the communication appliance (e.g., an infrared communication interface).

Subsequently, the IP telephone 20 initiates contact with the appliance connection server 32 for secure communications therewith.

Figure 2:
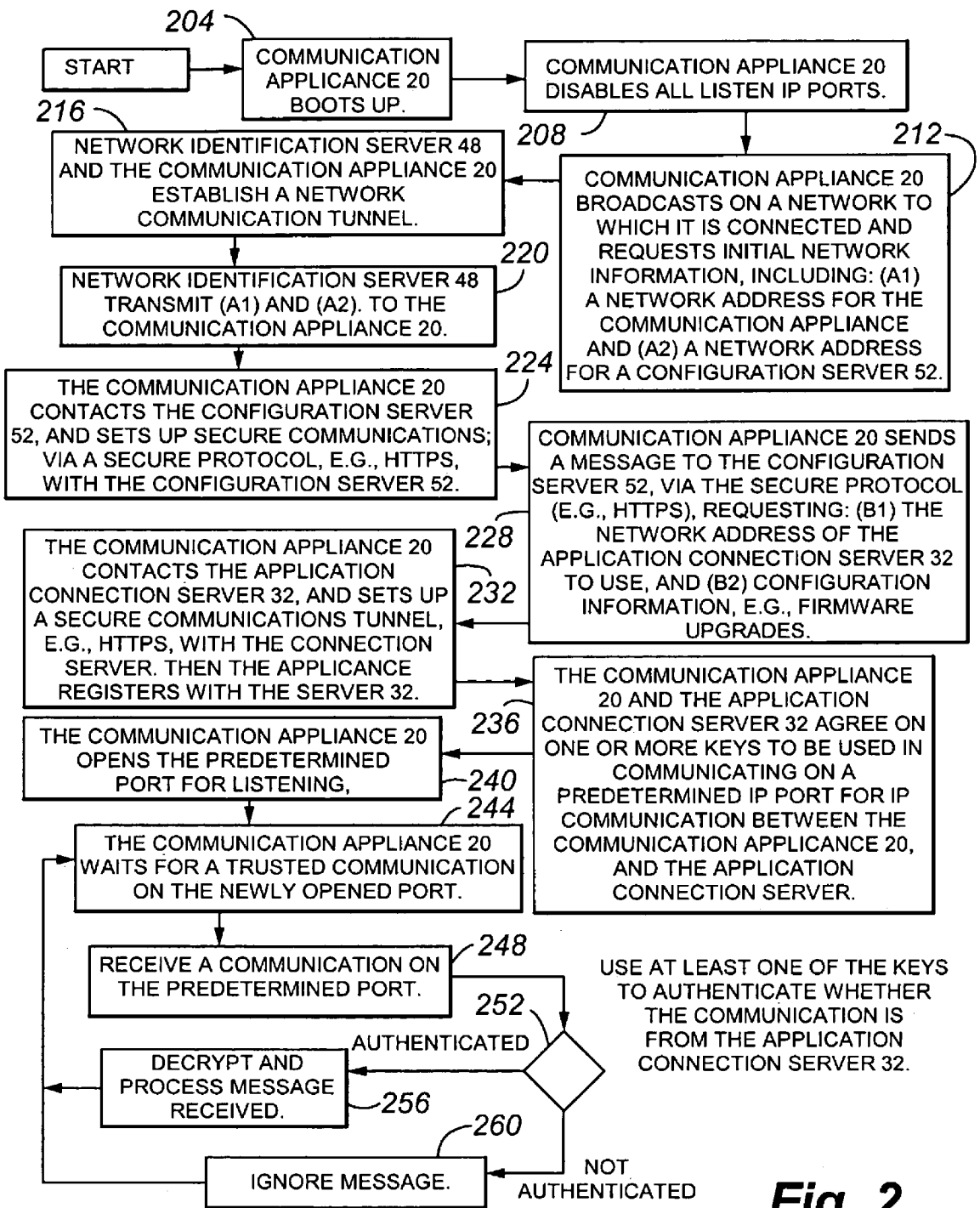
FIG. 2 is a flowchart illustrating the steps performed in establishing secure communications between a network communication appliance 20 and the appliance connection server 32.

FIG. 2 shows a more detailed flowchart of the steps briefly described above for activating an IP telephone 20 (or other communication appliance according to the present invention, these two terms used interchangeably hereinbelow), and providing secure communications therewith. In step 204, the IP telephone 20 is activated or booted up by, e.g., a user. Note that when activated, the communication appliance 20 registers with the call server 24, as one skilled in the art will understand. In step 208, the communication appliance 20 disables all IP ports on which the appliance will eventually listen for IP communications. In step 212, the communication appliance 20 broadcasts a message on the IP network (to which it has been connected), and requests from the identification server 48 initial network information such as: (a1) an IP address by which the IP telephone 20 can be identified, and (a2) a network IP address for the configuration server 52. To initiate communications with the network identification server 48, the communication appliance 20 broadcasts, e.g., predetermined data requesting the network IP addresses, and then monitors the network while waiting for a response. Assuming a network identification server 48 receives the broadcast message and responds, a communications tunnel (as it is referred to in the art) will be established between the server 48 and the IP telephone 20 (step 216). Subsequently, the network IP addresses of (a1) and (a2) will be transmitted to the IP telephone 20 via the communications tunnel (step 220).

Note that in one embodiment, where the communication appliance 20 is provided by, e.g., Avaya Inc., the IP address of the configuration server 52 is transmitted to the communication appliance in a data field that has been pre-assigned to Avaya, and can therefore be identified and used by the Avaya communication appliance since its firmware includes programmatic instructions for decoding the pre-assigned data field and using the information therein.

Upon receipt of the IP addresses, the communication appliance 20 sends (step 224, FIG. 2) a network IP message addressed to the configuration server 52, wherein the message requests secure communications (e.g., a secure communications tunnel) with the configuration server 52. In one embodiment, such secure communications is provided using the IP communications protocol HTTPS (i.e., HTTP over the Transport Layer Security, TLS) which is well known in the art, and is fully described in the following references fully incorporated by reference herein: IETF RFC 2246 (http://www.ietf.org/rfc/rfc2246.txt) and IETF RFC 2818 (http://www.ietf.org/rfc/rfc2818.txt). Moreover, to more fully disclose the present invention, a brief description of the steps performed by the TLS protocol is provided here as follows:

(1.1) The client (e.g., a communications appliance 20) sends a "Client hello" message to the server (e.g., the network identification server 48), along with a random value for the client, and cipher suites supported by the client.

(1.2) The server responds by sending a "Server hello" message to the client, along with the server's random value.

(1.3) The server sends its x509v3 certificate to the client for authentication and may request a certificate from the client. The server sends the "Server hello done" message.

(1.4) The client creates a random Pre-Master Secret and encrypts it with the public key from the server's certificate, sending the encrypted Pre-Master Secret to the server.

(1.5) The server receives the Pre-Master Secret. The server and client each generate the Master Secret and session keys based on the Pre-Master Secret.

(1.6) The client sends a "Change cipher spec" notification to the server to indicate that the client will start using the new session keys for hashing and encrypting messages. The client also sends a "Client finished" message to the server.

(1.7) The server receives the "Change cipher spec" and switches its record layer security state to symmetric encryption using the session keys. The server sends a "Server finished" message to the client.

The client and server can now exchange application data (such as HTTP data) over the secured channel they have established. Accordingly, all messages sent from the client to the server and from the server to the client are encrypted using the session keys.

Once the configuration server 52 and the communication appliance 20 establish secure communications, e.g., via a secure tunnel using HTTPS on the IP network (e.g., a local, site-wide, or enterprise-wide IP network, or, the Internet), in step 228, the communication appliance 20 requests any configuration information available at the configuration server. Accordingly, the configuration server 52 transmits, via the secure communications tunnel, the following information to the communication appliance 20:

(a) the network IP address of the appliance connection server 32;

(b) any firmware revisions or updates;

(c) any other necessary software and/or other information for enabling operation of the communication appliance 20;

(d) information necessary to authenticate the firmware (e.g. digital signature or hash of the firmware file); and/or (e) directions to securely retrieve related or additional configuration or firmware information from a different or backup server.

In step 232, the communication appliance 20 transmits an IP message to the appliance connection server 32, wherein a secure communications tunnel is established between the communication appliance 20 and the appliance connection server 32 via, e.g., HTTPS as described in steps (1.2) through (1.8) above. Thus, once the secure communications tunnel is established, in step 236, the communication appliance 20 and the appliance connection server 32 communicate via the secure communications tunnel to agree on one or more keys to be subsequently used to both authenticate and encrypt/decrypt IP network communications from and to a specified port of the communication appliance 20. Additionally, the communication appliance 20 registers with the appliance connection server 32 by providing its IP address (via an authenticated message) to the appliance connection server 32.

The communication appliance 20 may also negotiate with the appliance connection server 32 for additional keys and methods used for subsequent encryption and authentication. Note that agreement on the key(s) can be performed in various ways such as distribution of keys from one party to another, negotiation of keys where each party contributes a portion of the resulting keys, or cryptographic creation of keys through symmetric or asymmetric techniques as one skilled in the art will understand.

Subsequently in step 240, the specified port of the communication appliance 20 is opened as substantially the only IP port that the communication appliance 20 listens for IP information from a source such as the appliance connection server 32, or a third party IP application 36 (via the appliance connection server 32).

The one or more agreed to keys are used to both authenticate and encrypt/decrypt subsequent IP packets transmitted between the communication appliance 20 and the appliance connection server 32. In particular, the encryption algorithm used may be any of the widely used encryption algorithms such as AES, RC4, Two Fish, Blow Fish, Triple-DES, DES, etc. Moreover, the authentication to be used in such subsequent communication may be a hash message authentication code which is authenticated by an authentication technique such as HMAC (as described in IETF RFC 2104 (http://www.ietf.org/rfc/rfc2104.txt) fully incorporated herein by reference), the SHA1 authentication algorithm (as described in NIST, FIPS PUB 180-1: Secure Hash Standard fully incorporated herein by reference), or the MD5 authentication algorithm (as described in IETF RFC 1321 (http://www.ietf.org/rfc/rfc1321.txt) fully incorporated herein by reference). However, to provide further disclosure regarding such authentication techniques, at a high level such techniques use a code that is incorporated as a separately accessible portion of each IP packet such that when the packet is received, the code and, e.g., the actual message within the packet are provided as a pair to the authentication technique. Accordingly, if the result from the authentication technique matches the value of the code as calculated via a predetermined algorithm which receives as input: the rest of the IP packet and/or one or more of the keys negotiated between the communication appliance 20 and the appliance connection server 32, then the message portion of the IP packet is considered authentic and, as a result, is decrypted and processed.

Once the above key(s) are agreed upon, and the communication appliance 20 opens a specified port for listening for IP communications (step 204), it then waits for IP communications on this port (step 244). Thus, when a communication is detected on the specified port (step 248), the communication appliance 20 uses at least one of the negotiated keys to first authenticate each IP packet for determining that the packet was transmitted by the appliance connection server 32 (step 252), and if authenticated, then (step 256) the communication appliance decrypts the message portion of the packet and processes the message. Alternatively, if the packet cannot be authenticated, then (step 260) the EP packet may be ignored or discarded, and accordingly is not decrypted. Thus, once the current IP packet has been processed or ignored, the communication appliance 20 returns to a state (i.e., step 244) wherein another IP packet on the specified port can be at least inspected for authentication.

It is important to note that the step 260 of ignoring an IP packet effectively can be understood as the processing of the IP packet differently from how it would have been processed if it had been determined to be authenticate (i.e., from the appliance connection server 32). For example, an instruction or request in the IP packet will not be performed if the IP packet is determined not to be authentic. In particular, such "ignoring" may be embodied in various ways such as: (a) allowing the data storage for IP packet to be overwritten so that the information in the packet is no longer available for its intended use, (b) quarantining the IP packet so that it may be subsequently inspected, (c) not decrypting the data message portion of the IP packet, and/or (d) transmitting the IP packet to the appliance connection server 32 (another IP network address) so that it can be further analyzed.

Thus, substantially all IP communications to and from the communication appliance 20 are only with the appliance connection server 32 (or another authenticated instance of such an appliance connection server) via the specified port on the communication station 20. Moreover, the communication appliance 20 can subsequently reject substantially all communications from any source other than the appliance connection server 32.

It is worthwhile to note that the appliance connection server 32 will typically be the intermediary between a plurality of IP applications 36, and a plurality of communication appliances 20. In various embodiments, the communication appliances 20 and/or the IP applications 36 may be such that:
 (a) The communication appliances 20 and the IP applications 36 are on the same IP network; e.g., the IP applications 36 and the communication appliances 20 may be entirely local to a military or governmental site.
 (b) Some of the IP applications 36 may be external to an IP network having one or more of the communication appliances 20. For example, if the communication appliances 20 are all within a hotel complex, there may be certain IP applications 36 that are provided by the hotel itself, but other IP applications may be provided via the Internet (e.g., restaurant menus and directions thereto, sightseeing services, etc.).
 (c) The communication appliances 20 may be connected to the Internet as the IP network, and accordingly, only the Internet IP applications having authorization to access the appliance connection server 32 will be allowed to communicate with the communication appliances 20.

Thus, it is to be understood that the communication arrows of FIG. 1 represent communications through various networks. For example, the illustrated communications between the communication appliances 20 and the call server 24 typically would be via a conventional telephony connection to a public switched telephone network (PSTN) and/or to a telephony wireless network. Additionally, communications between the communication appliances 20 and the network identification server 48 may be via an IP network that is local to a particular site (e.g., hotel, military base, university, etc.). Also, the communications between the communication appliances 20 and the configuration server 52 may be via the Internet, while the communications between the communication appliances 20 and the appliance connection server 32 may be via an IP network that is enterprise-wide (i.e., a private IP network that spans multiple spaced apart sites, each site having at least one local area network). Moreover, it is also within the scope of the present invention for one or more of the network identification server 48, the configuration server 52, and/or the appliance connection server 32 to be co-located; however, such co-location does not imply identical network access addresses.

To further describe the processing that can be performed at the appliance connection server 32, reference is again made to FIG. 1. The appliance connection server 32 includes both encryption 304 and decryption 308 modules (when such modules are distinct). These modules perform the encryption and decryption of IP communications with the communication appliance(s) 20 described hereinabove. The encryption module 304 receives data for encryption from the application programming interface (API) 312 that provides a common network interface to the IP applications 36. In particular, the API 312 may be a substantially conventional IP network interface as is well known in the art. Thus, the API 312 may re-arrange IP requests so that they are processed in the order transmitted rather than the order received, and extract application data from the requests prior to outputting such application data to the encryption module 304. Moreover, note that an application manager 320 may communicate with the API 312 (and/or other modules such as the IP telephone network interface 324) to ensure that the IP application data is routed to the appropriate communication appliance 20 on the appropriate network (if the appliance connection server 32 provides secure communication services to communication appliances 20 residing on a plurality of IP networks). Note, however, that the encryption module 304 must be provided with sufficient information to determine the appropriate encryption key(s) to use in encrypting data received from the API 312, since each communication appliance 20 is likely to have a different set of one or more keys to be used in encrypting such application data. Similarly, the authentication module 330, which receives encrypted data from the encryption module 304, must also have access to information that is specific to a communication appliance 20 for attaching an appropriate authentication code to the encrypted application data. Accordingly, in at least one embodiment of the appliance connection server 32, each of these modules is able to access an IP telephone database 336 that may be similar to a home location register (HLR) in a more traditional telephony context. In particular, the database 336 may provide information about each of the plurality of communication appliances 20 that securely communicate with the appliance connection server 32. For example, for each such communication appliance 20, the database 336 may include the following information:
 (a) phone extension;
 (b) IP address;
 (c) MAC value (i.e., Media Access Control value—the ISO Layer 2 identifier);
 (d) encryption keys;
 (e) authentication keys; and
 (f) key identifiers (e.g., various authentication keys, and various encryption keys. Alternatively, such a key identifier may be an indicator of which key to use and for which purpose).

Accordingly, once the authentication module 330 has provided an authorization code to an application message, the message is provided to the message queuing module 340 for determining the priority of the message in comparison to other messages being transmitted both: (a) to the communication appliances 20 on a given IP network, and (b) to a given communication appliance. For example, if message corresponding to various advertisements are queued for eventual transmission to one or more communication appliances 20, and a reverse 911 alert is also detected by the message queuing module 340, then all such advertisements (as well as most other IP communications) may be pre-empted such that they may be sent at a much later time or not sent at all.

In any event, when messages are output by the message queuing module 340, these messages are then provided to the IP telephone interface 324 for routing on the appropriate network to the target communication appliance 20.

Conversely, when IP messages are received by the appliance connection server 32 from one of the communication appliances 20, such messages are first identified by the IP telephone network interface 324 as to their presumed originating communication appliance 20, and then these IP messages are provided to the authentication module 330 for authenticating that the messages are indeed from the presumed originating communication appliance. Assuming that the messages are authenticated, the encrypted application data within the messages is provided to the decryption module 308 for decryption and are subsequently provided to the API 312 for transmitting to the destination IP application 36 identified in the IP messages received from the communication appliance 20. Thus, it can be seen that the appliance connection server 32 offers substantial benefits to the IP applications in that such applications can have much greater assurance that the communication appliances 20 with which the IP applications communicate are legitimate and that the application is not being spoofed.

Communication with each of the communication appliances 20 may be controlled by an IP phone controller 348, wherein this controller handles such events as:
  (a) poor communication with a communication appliance 20;
  (b) a request for monitoring a communication appliance 20 (e.g., by instructing the communication appliance to allow the third party monitoring site 40 to monitor, intercept, and/or process all IP and telephony communications with other parties); and
  (c) the updating of a communication appliance 20 with configuration or processing information.

In order for certain IP applications 36 to be accessed, licenses may be required. For example, an enterprise having a plurality of the communication appliances 20 registered thereto may desire to purchase four licenses to a particular proprietary IP application 36, such as a stock brokerage transaction service, or access to a proprietary patent database. Accordingly, a licensing manager 352 may be provided by the appliance connection server 32, wherein this licensing manager ensures that, e.g., the number of activations of the IP application by the enterprise does not violate the license. Accordingly, such a licensing manager 352 may communicate with the application manager 320 for determining what communication appliances 20 are communicating with what IP applications 36.

In certain contexts, it is important for IP communications between IP applications 36 and communication appliances 20 to be logged and/or monitored. Accordingly, the appliance connection server 32 may also include a communications logging module 356 and a communications monitoring module 360. In one embodiment, instructions for performing logging and/or monitoring are provided by one or more of: the application manager 320, the IP phone controller 348, or the server controller 364. Note that the server controller 364 provides overall supervisory control of the appliance connection server 32. Accordingly, the server controller 364 performs at least the following functions:
  (a) scheduling processing time for different applications; e.g., prioritizing communications with various communication appliances 20, and in particular, transmitting emergency response communications prior to other communications;
  (b) enforcing licensing restrictions of applications; and
  (c) authenticating new applications, and/or authenticating application license changes prior to accepting or executing such changes.

The present invention may be embodied as a combination of both hardware devices and software (including firmware). Accordingly, suitable software for operatively enabling various aspects of the present invention, discussed herein and shown in the accompanying figures, can be provided on a computer-readable medium or media, and can be coded using any suitable programming or scripting language. However, it is to be understood that the invention as described herein is not dependent on any particular operating system, environment, or programming language. Illustrative operating systems include without limitation LINUX, UNIX, or any of the Windows™-family of operating systems, and illustrative languages include without limitation a variety of structured and object-oriented languages such as C, C++, Visual Basic, or the like, as well as various network communication languages such as Perl.

As those skilled in the art will also understand, the program(s) of instructions for embodying the various aspects of the invention can be loaded and stored onto a program storage medium or device readable by a computer or other machine, executed by the machine to perform the various aspects of the invention as discussed and claimed herein, and/or as illustrated in the accompanying figures. The program storage medium can be implemented using any technology based upon materials having specific magnetic, optical, semiconductor or other properties that render them suitable for storing computer-readable data, whether such technology involves either volatile or non-volatile storage media. Specific examples of such media can include, but are not limited to, magnetic hard or floppy disks drives, optical drives or CD-ROMs, and any memory technology based on semiconductors or other materials, whether implemented as read-only or random access memory. In particular, an embodiment of the invention may reside on a medium directly addressable by a computer's processor (main memory, however implemented), and/or on a medium indirectly accessible to the processor (secondary storage media such as hard disk drives, tape drives, CD-ROM drives, floppy drives, or the like).

Moreover, although various components of the present invention have been described in terms of communications on an IP network, it is within the scope of the present invention to encompass other types of networks, for example, Novell or AppleTalk networks. Additionally, the modules described hereinabove of the appliance connection server 32 may be distributed on one or more networks, as one skilled in the art will understand. Furthermore, a program and data storage device (e.g., the IP telephone database 336) can be affixed permanently or removably to a bay, socket, connector, or other hardware provided by a cabinet, motherboard, or another component of a given computer system or a given networked distributed computing system.

Those skilled in the art will also understand that networked computational components in accordance with the above teaching using known programming languages provides suitable means for realizing the various functions, methods, and processes as described and claimed herein and as illustrated in the accompanying figures attached hereto.

Those skilled in the art will further understand, when reading this description, that unless expressly stated to the contrary, the use of a singular or a plural number herein is generally illustrative, rather than limiting, of the instant invention. Accordingly, unless expressly stated otherwise or clear from the context, where a given item or aspect of the invention is discussed herein in the singular, it is to be understood that the invention also contemplates a plural number of such items.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for communicating with a telephony enabled device, wherein the device is also capable of communicating on an Internet protocol based (IP) network, comprising:
    activating the telephony enabled device for communicating on a telephony network and communicating on the IP network;
    the telephony enabled device broadcasting on the IP network a request for initial IP network information;
    in response to the broadcast, the telephony enabled device first receiving an IP address for the telephony enabled device via the first communication;
    in response to the broadcast, the telephony enabled device performing a first set of communications with a network node identified by a first IP address for establishing a first communication therebetween;
    the telephony enabled device second receiving update information related to an update of operational information used in operating the telephony enabled device, wherein the update information is received via an encrypted and authenticated communication on the IP network from the network node;
    the telephony enabled device third receiving a second IP address from the network node for an IP server;
    in response to receiving the second IP address, the telephony enabled device fourth receiving security information for encrypting and authenticating IP communications received by the telephony enabled device from the IP server, wherein the security information is determined via an encrypted and authenticated communication on the IP network;
    the telephony enabled device authenticating, with the security information, an IP communication between the IP server and the telephony enabled device, including a substep of authenticating whether an IP communication received on a particular port of the telephony enabled device is from the IP server;
    the telephony enabled device decrypting, with the security information, the IP communication between the IP server and the telephony enabled device; and
    wherein subsequent processing of each communication C of at least most IP communications on the port is dependent upon a corresponding result for authenticating that the communication C is from the IP server, wherein when said result indicates the communication C is not from the IP server, at least one instruction in the communication C is not processed in a manner that the instruction would be processed if said result indicated C were from the IP server.

2. The method of claim 1, wherein said step of activating includes preventing reception of communications on at least one IP port.

3. The method of claim 1, wherein the request comprises a request for one or more of: the IP address for the telephony enabled device, and the first IP address for the network node from which said update information is received.

4. The method of claim 1, wherein the update of operation information includes information for configuring the telephony enabled device.

5. The method of claim 1, wherein the telephony enabled device receives further information from the network node, the further information includes receiving one or more of the following:
    (a) a firmware revision or data update for the telephony enabled device;
    (b) other necessary information for enabling operation of the telephony enabled device;
    (c) information necessary to authenticate firmware; and
    (d) information to securely retrieve information from a backup server.

6. The method of claim 5, wherein at least some of (a) through (d) are received.

7. The method of claim 1, wherein said step of fourth receiving includes establishing secure communications with the IP server for communicating one or more encryption or decryption keys as at least part of the security information.

8. The method of claim 1, wherein said step of authenticating includes satisfying network requests that are first identified as from the IP server, and not satisfying at least most requests from network sources different from the IP server.

9. The method of claim 1, wherein the IP server controls at least one of network access to the telephony enabled device and network communication to the telephony enabled device.

10. A method for providing both telephony and IP network services, including:
    a network identification server transmitting a network address in response to a request for a network address by a network communication appliance;
    a configuration server transmitting configuration information in response to a request by the network communication appliance;
    an appliance connection server communicating with the network communication appliance, wherein for at least most IP communications with the network communication appliance, the IP communications are with the appliance connection server, wherein said appliance connection server is an intermediary server that can perform steps (a) to (e) and selectively perform one of the following:
    (a) determining whether a licensing criterion is satisfied for an application in communication with the network communication appliance;
    (b) encrypting information received from an application communicating with the network communication appliance;
    (c) decrypting information received from the network communication appliance for subsequently transmitting to an application communicating with the network communication appliance;
    (d) accessing, information about the network communication appliance, including one or more of:
        (d-1) a telephony extension for the network communication appliance;
        (d-2) an IP address for the network communication appliance;
        (d-3) an encryption key for encrypting information transmitted to the network communication appliance;
        (d-4) an authentication key for authenticating information received from the network communication appliance; and (e) at least one of: exchanging and negotiating keys for subsequently encrypting and authenticating communications between the network communication appliance and the server.

11. The method of claim 10, wherein said step of the network identification server transmitting is in response to a network broadcast for network information that includes one or more of: a network address, and a network address of a network server.

12. The method of claim 10, wherein said step of the configuration server transmitting includes transmitting one or more of the following:
   (i) the network IP address of an appliance connection server;
   (ii) a firmware revision or data update for the network communication appliance;
   (iii) other necessary information for enabling operation of the network communication appliance;
   (iv) information necessary to authenticate the firmware; and
   (v) information to securely retrieve information from a backup server.

13. The method of claim 12, wherein at least some of (i) through (v) are transmitted to the network communication appliance.

14. The method of claim 10, wherein said step of communicating includes establishing secure communications with the appliance connection server for communicating one or more encryption or decryption keys with the network communication appliance.

15. The method of claim 10, wherein said step of communicating includes satisfying network requests that are first identified as from the network communication appliance, wherein said step of satisfying includes authenticating that the request is from one of a plurality of network communication appliances registered to communicate with the appliance connection server for receiving encrypted communications from the appliance connection server, wherein the appliance connection server is an intermediary network node for controlling communications between the plurality of network communication appliances and a plurality of applications.

16. The method of claim 15, wherein said appliance connection server communicates with the plurality of applications via a common application programming interface.

17. A communication appliance for performing the following steps:
   broadcasting a request for a network address;
   first receiving a network address in response to the request for a network address by the communication appliance from a network identification server;
   sending a request for configuration information to a configuration server;
   second receiving configuration information in response to the request by the communication appliance from the configuration server;
   communicating with an appliance connection server, wherein the appliance connection server serves as an intermediary network node that can perform steps (a) to (e) and selectively perform one of the following with each application (A) of a plurality of applications that communicate with the appliance connection server via an IP network:
   (a) determining whether a licensing criterion is satisfied for the application A in communication with the network communication appliance; (b) encrypting information received from the application A communicating with the network communication appliance;
   (c) decrypting information received from the network communication appliance for subsequently transmitting to the application A communicating with the network communication appliance;
   (d) accessing information about the network communication appliance, including one or more of:
      (d-1) a telephony extension for the network communication appliance;
      (d-2) an IP address for the network communication appliance;
      (d-3) an encryption key for encrypting information transmitted to the network communication appliance;
      (d-4) an authentication key for authenticating information received from the network communication appliance; and
   (e) at least one of: exchanging and negotiating keys for subsequently encrypting and authenticating communications between the network communication appliance and the server.

18. The communication appliance of claim 17, wherein at least two different network communication protocols are used for communicating with third parties, wherein one of the protocols is TCP/IP.

* * * * *

UNITED STATES PATENT AND TRADEMARK OFFICE
CERTIFICATE OF CORRECTION

PATENT NO.        : 7,965,701 B1
APPLICATION NO.   : 11/119188
DATED             : June 21, 2011
INVENTOR(S)       : Roger Toennis et al.

It is certified that error appears in the above-identified patent and that said Letters Patent is hereby corrected as shown below:

At Column 13, line 59 after "said result indicated" insert --communication-- therein.

Signed and Sealed this
Twenty-second Day of May, 2012

David J. Kappos
*Director of the United States Patent and Trademark Office*